United States Patent [19]
Vieillefosse

[11] Patent Number: 5,383,020
[45] Date of Patent: Jan. 17, 1995

[54] METHOD AND APPARATUS FOR DETERMINING THE COLOR OF A TRANSLUCENT OBJECT SUCH AS A TOOTH

[75] Inventor: Michel Vieillefosse, Aix En Provence, France

[73] Assignee: Bertin & Cie, Plaisir, France

[21] Appl. No.: 991,201

[22] Filed: Dec. 15, 1992

[30] Foreign Application Priority Data

Dec. 23, 1991 [FR] France ............................. 9115984

[51] Int. Cl.6 ............................................ G01J 3/50
[52] U.S. Cl. .................................... 356/326; 356/405; 356/407; 356/425
[58] Field of Search ............. 356/326, 328, 402, 405, 356/406, 407, 418, 419, 425; 364/526

[56] References Cited

U.S. PATENT DOCUMENTS

3,986,777 10/1976 Roll .
4,654,794 3/1987 O'Brien .
4,836,674 6/1989 Leguime et al. .................... 356/328
4,881,811 11/1989 O'Brien ............................... 356/323

FOREIGN PATENT DOCUMENTS

360657 3/1990 European Pat. Off. .
WO86/03292 6/1986 WIPO .

*Primary Examiner*—F. L. Evans
*Attorney, Agent, or Firm*—Bell, Seltzer, Park & Gibson

[57] ABSTRACT

The invention relates to a method and to apparatus for determining the color of a translucent object such as a tooth by measuring the reflectance of said object at wavelengths corresponding essentially to sensitivity maxima of the human eye to hue and to saturation, by calculating the luminance of white included in the luminance of the object illuminated by a determined standard illuminant, by calculating a saturation percentage for the color of the object as seen by the human eye, and by determining the pigmentations of said color relative to white.

4 Claims, 2 Drawing Sheets

METHOD AND APPARATUS FOR DETERMINING THE COLOR OF A TRANSLUCENT OBJECT SUCH AS A TOOTH

The invention relates to a method and to apparatus for determining the color of an object, in particular a translucent object such as a tooth in the mouth, and on the basis of the reflectance of the object as illuminated by a polychromatic light source.

BACKGROUND OF THE INVENTION

Present methods for determining the color of an object are based on measuring the spectral reflectance of the object as illuminated by a polychromatic light source and by determining the tristimulus values X, Y, Z, or L*, a*, b* for determined illuminants.

However, the results which are obtained are generally not satisfactory when such methods are applied to determining the color of an object that is translucent, as applies to a tooth in the mouth.

In principle, reconstituting a color by means of tristimulus values is not very reliable at wavelengths that correspond to transitions between the primary colors, i.e. in the vicinity of the wavelengths at the intersections between the curves of the distribution coefficients $\bar{x}$, $\bar{y}$, and $\bar{z}$ of the CIE colorimetric reference observer: it is at these wavelengths that the human eye perceives the greatest differences of hue for a given variation in wavelength.

In addition, teeth have large hue dispersions in the vicinity of these wavelengths, which provides an explanation for the poor results of known methods. The translucent nature of teeth constitutes an additional source of error since teeth that are apparently very white may have a light reflection coefficient that is half that of teeth that are yellower or browner in hue, thereby modifying the spectral reflectance and giving rise to erroneous conclusions.

An object of the invention is to provide a method and apparatus enabling the color of a tooth to be determined reliably, taking account of its transparency or translucency, in particular for the purpose of making a dental prosthesis having the same color.

More generally, another object of the invention is to provide a method and apparatus enabling the color of a translucent object to be determined without risk of error.

SUMMARY OF THE INVENTION

To this end, the invention provides a method of determining the color of a translucent object, such as a tooth in the mouth, for example, on the basis of the reflectance of said object illuminated by a polychromatic light source, wherein the method consists in measuring the reflectance of the object at wavelengths corresponding essentially to sensitivity maxima of the human eye to hue and to saturation, and in deducing from said reflectance measurements an indicator for restituting the transparency of the object, together with a color saturation coefficient of the object as seen by the human eye and the pigmentations of said color relative to white in predetermined wavelength ranges.

The invention is thus not based on determining the tristimulus values of the color of the object for one or more determined illuminants, but on determining the saturation of the color of the object as seen by the human eye and taking account of the transparency of the object, and of the pigmentations of said color relative to white.

The transparency restitution indicator of the object is obtained by determining the luminance of a white object included in the luminance of the object illuminated by a determined illuminant. The saturation percentage of the color of the object is determined therefrom by the ratio of the included luminance divided by the total luminance of the object as seen by the human eye.

The pigmentations of the color of the object are defined by the differences between its luminance and the included luminance of a white object as seen by the human eye for a determined illuminant, over determined wavelength ranges.

With teeth, it is thus possible to determine the yellow or yellow-red pigmentation of a tooth and its blue-green pigmentation for a determined illuminant, which is then preferably the standardized diffuse illumination of sunlight.

Still with teeth, the reflectance measurements are performed at wavelengths substantially equal to 440 nm, 495 nm, 520 nm, 577 nm, and 600 nm.

The wavelengths of 495 nm and 600 nm correspond to the maxima of eye sensitivity to hue, and the wavelength of 577 nm corresponds to the maximum of eye sensitivity to saturation.

To determine the color to be given to a dental prosthesis, the method of the invention also consists in comparing the color of the tooth as determined in this way with known colors of a palette, firstly by comparing the saturation percentage of the tooth color with the corresponding saturation percentages of palette colors, and then comparing the pigmentations of the tooth color with the corresponding pigmentations of the palette colors.

Thereafter, the luminance of a white object included in the luminance of the tooth is compared with the luminances of a white object included in the luminances of the colors of the palette.

These dispositions are naturally applicable to determining the colors of translucent objects other than teeth.

The invention also provides an apparatus for determining the color of a translucent object, such as a tooth in the mouth, for example, the apparatus comprising a source of polychromatic light associated with an optical system for illuminating the object, an optical system for picking up light diffused by the object, a spectrometer receiving said light, photodetectors disposed at the output from the spectrometer, and an analog-to-digital converter connecting the photodetectors to a data processor system such as a microcomputer, wherein the spectrometer and the photodetectors are designed to detect the reflectance of the object at wavelengths corresponding essentially to the maxima in the sensitivity of the human eye to hue and to saturation, and wherein the data processor system is programmed to determine, on the basis of said reflectance measurements, a transparency restitution indicator for the object together with a saturation percentage of its color as seen by the human eye and the pigmentations of said color relative to white over predetermined wavelength ranges.

The spectrometer and the photodetectors are designed to detect the reflectance of the object at wavelengths substantially equal to 495 nm, 577 nm, and 600 nm, and also at 440 nm and 520 nm, in particular for teeth.

The data processor system is programmed to determine the saturation coefficient and the pigmentations of the color of the object relative to white for a determined standard illuminant, such as the standardized diffuse illumination of sunlight when the object is a tooth.

The values of saturation percentage, of pigmentation, and of white luminance for colors in a palette as measured under the same conditions as the color of the object are recorded in a memory of the data processor system, which system is programmed to compare sequentially and in order: the saturation percentage of the color of the object with the saturation percentages of the colors of the palette as recorded in the memory, then the pigmentations, and finally the white luminances, thereby determining the color in the palette which is closest to the color of the object, or the pigments to be added to a determined color to obtain the color of the object.

With teeth, the color to be given to a dental prosthesis is thus determined so that even though the prosthesis is not translucent its color is substantially identical to that of an adjacent tooth in the mouth of the patient.

BRIEF DESCRIPTION OF THE DRAWINGS

An embodiment of the invention is described by way of example with reference to the accompanying drawings, in which.

DETAILED DESCRIPTION

Figure 1:
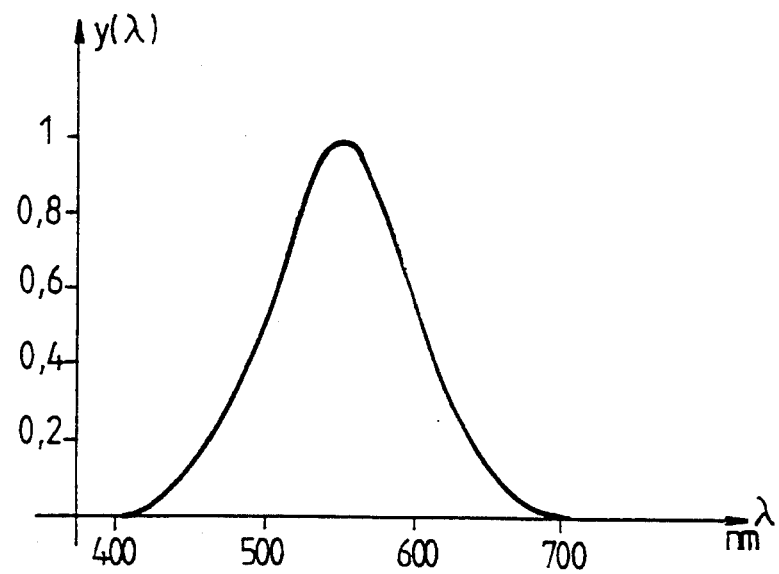
FIG. 1 is a graph showing the variation of relative efficiency of the human eye as a function of wavelength.

FIG. 1 is a diagram showing how the relative efficiency of the human eye varies as a function of wavelength, with relative efficiency being zero outside the range 400 nm to 700 nm, and being at a maximum at a wavelength of 555 nm.

Figure 2:
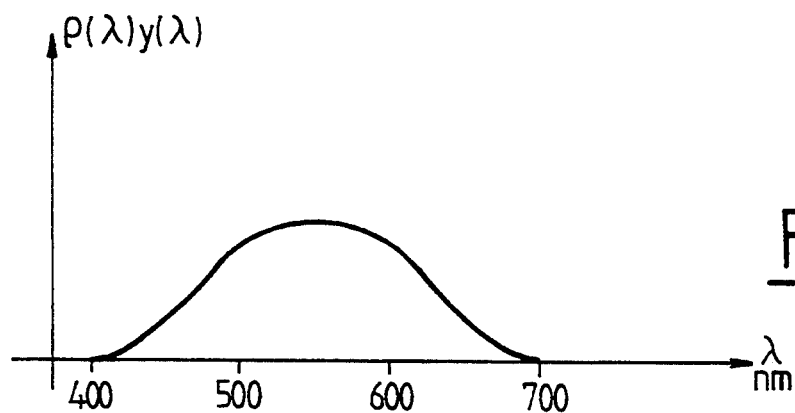
FIG. 2 is a graph showing diagrammatically the variation in the reflectance of a tooth as seen by the human eye as a function of wavelength.

When a colored object illuminated by polychromatic light is seen by the human eye, the curve of its diffuse spectral reflectance is modulated by the relative efficiency of the human eye, and a curve is obtained which is of the type shown in FIG. 2 (applicable to a tooth) where $\rho(\lambda)$ is the reflectance of the tooth and $y(\lambda)$ is the relative efficiency of the human eye.

Figure 3:
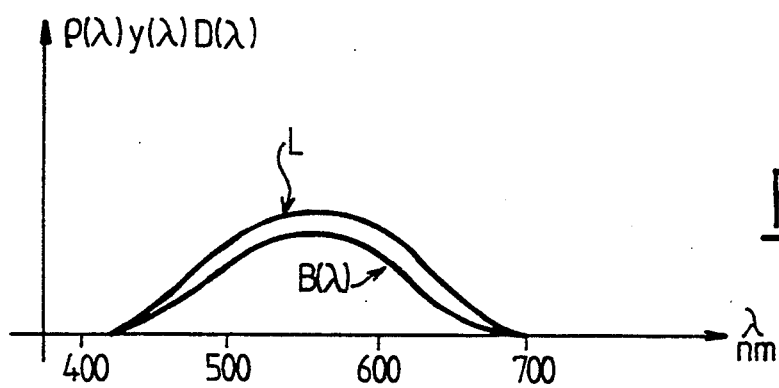
FIG. 3 is a graph showing diagrammatically the variation in the luminance of a tooth illuminated by a standard illuminant and as seen by the human eye, and as a function of wavelength.

When the tooth (or the object) is illuminated by an illuminant such as the standardized diffuse illumination $D(\lambda)$ of sunlight, the variation in its luminance as seen by the human eye, i.e. the quantity $\rho(\lambda).y(\lambda).D(\lambda)$ is shown as a function of wavelength by curve L in FIG. 3. In this figure, curve $B(\lambda)$ corresponds to the luminance of white included in the luminance of the observed object and as seen by the human eye, and in accordance with the invention the differences between the two curves L and $B(\lambda)$ make it possible to determine the pigmentations relative to white of the color of the observed tooth or object, as described in greater detail below.

Figure 4:
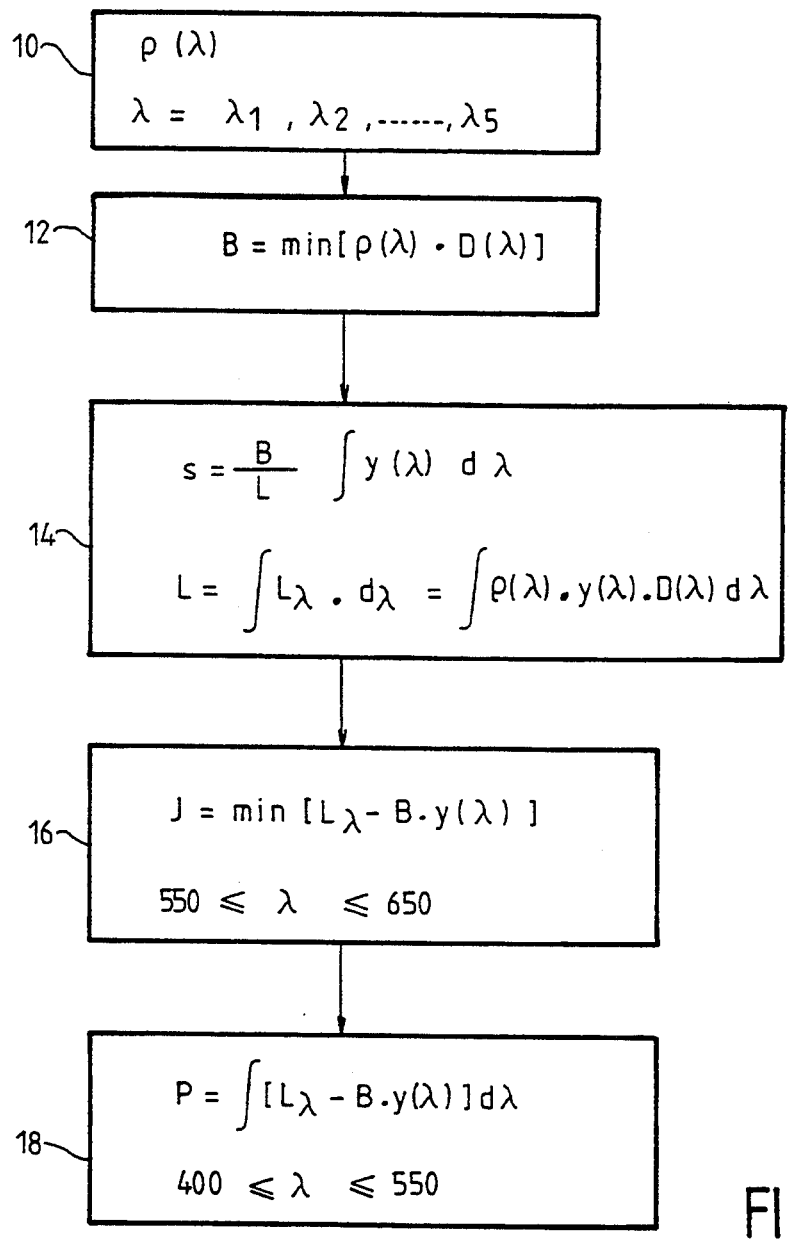
FIG. 4 is a flow chart outlining the essential operations of the method of the invention.

FIG. 4 shows the main operations in the method of the invention as applicable to determining the color of a tooth.

The first step given reference 10 consists in measuring the reflectance $\rho(\lambda)$ of a tooth illuminated by an arbitrary polychromatic light, which light may be substantially equal-energy light, for example. This reflectance is measured at various well-determined wavelengths, namely 440 nm, 495 nm, 520 nm, 577 nm, and 600 nm. The wavelengths of 495 nm and 600 nm correspond to maxima in the sensitivity of the human eye to hue. The wavelength of 577 nm corresponds to the maximum of eye sensitivity to saturation. The wavelength of 440 nm is the wavelength at which the widest differences in hue are observed on teeth. The wavelength of 520 nm corresponds substantially to the intersection between the curves for the coefficients $\bar{x}$ and $\bar{y}$ of the CIE colorimetric reference observer, the wavelength of 495 nm also corresponds to the intersection between the curves for the coefficients $\bar{y}$ and $\bar{z}$, and the wavelength of 577 nm corresponds approximately to the intersection between the curves for the coefficients $\bar{x}$ and $\bar{y}$.

On the basis of these five reflectance measurements, the luminance of a white object included in the luminance of the tooth is determined in a step 12. This white luminance, written B, is obtained from the minimum of the product $\rho(\lambda).D(\lambda)$, where $D(\lambda)$ is the standardized diffuse illumination of sunlight. This illumination is chosen in preference to any other standard illuminant because there is a tendency to rely most on daylight for determining the color of a dental prosthesis, and because the visible surfaces of teeth in the mouth are approximately vertical and are illuminated by diffuse sunlight and not by direct sunlight.

When the method of the invention is applied to determining the color of a horizontal translucent object, it is possible for the standard illuminant used to be the standardized direct illumination of sunlight.

The relative magnitude of the white luminance included in the total luminance of the tooth corresponds to a transparency restitution factor for the tooth, which factor varies as a function of the reflection coefficient of the tooth.

The following step 14 of the method consists in determining the saturation coefficient of the tooth color as seen by the human eye, which saturation coefficient is obtained from the ratio of the white luminance B over the total luminance L of the tooth using the following equation:

$$s = (B/L) \int y(\lambda) d\lambda$$

where:

$$L = \int L_\lambda . d\lambda = \int \rho(\lambda).y(\lambda).D(\lambda) d\lambda$$

$L_\lambda$ being the effective luminance seen by the by at a given wavelength.

Following step 16 of the method of the invention consists in determining the yellow pigmentation or yellow-red pigmentation of the color of the tooth relative to white, as seen by the human eye. This is done using the following equation:

$$J = \min [L_\lambda - B.y(\lambda)]$$

the wavelength lying between about 550 nm and 650 nm.

This pigmentation corresponds to the minimum of the difference between the righthand portions of the curves L and B(λ) in FIG. 3.

Similarly, as shown at 18, the blue-green pigmentation of the tooth relative to white is determined, with said pigmentation P being given by the following equation:

$$P = \int [L_\lambda - B.y(\lambda)] d\lambda$$

with λ lying between about 400 nm and 550 nm.

This pigmentation corresponds to the difference between the lefthand portions of the curves L and B(λ) in FIG. 3.

Figure 5:
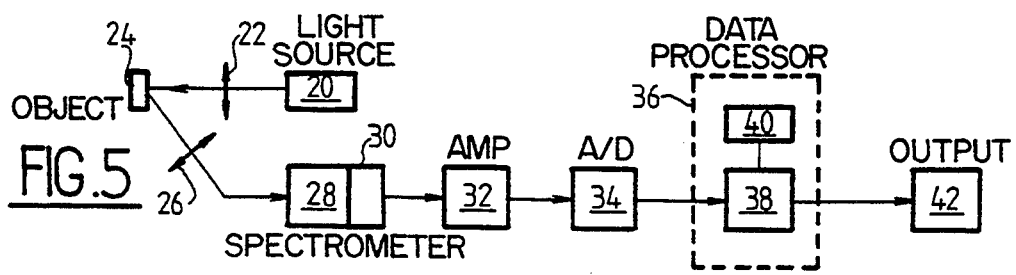
FIG. 5 is a block diagram showing the essential components of apparatus of the invention.

The method of the invention is implemented by means of apparatus such as that shown in FIG. 5, which apparatus comprises a source 20 of polychromatic light associated with an optical system 22 for illuminating an object 24 such as a tooth in the mouth. The light diffused by the surface of the object 24 is taken up by an optical system 26 and is transmitted to a spectrometer 28 having photodetectors 30 at its outlet, e.g. one or more strips of silicon photodiodes.

Amplifier circuits 32 connect the outputs of the photodetectors 30 to an analog-to-digital converter 34 whose output is connected to an input of a data processor system 36, e.g. of the microcomputer type, comprising a microprocessor 38 associated with memories 40 and with an output peripheral unit 42 such as a printer and/or a display screen.

In conventional manner, measurements of reflectance on objects 24 (or teeth) are performed in alternation with calibration measurements performed on a reference sample such as a ceramic having calibrated spectral reflectance. The reflectance ρ(λ) of the object (or the tooth) is then obtained using the following equation:

$$\rho(\lambda) = \rho_m(\lambda).r(\lambda)/r_m(\lambda)$$

where:
- $\rho_m(\lambda)$ = the measured reflectance of the object or tooth;
- $r(\lambda)$ = the reflectance of the sample; and
- $r_m(\lambda)$ = the reflectance measured on the sample.

One of the memories 40 of the data processor system 36 contains software or a program (whose flow chart is given in FIG. 4) for the purpose of performing reflectance measurements on the object or tooth at the five above-mentioned wavelengths, and for calculating the quantities B, s, J, and P.

When determining the color to be given to a dental prosthesis, the memory 40 of the data processor system 36 also contains values of these quantities, B, s, J, and P as measured under the same conditions on color samples from a palette provided by a manufacturer.

The software or program recorded in the memories of the data processor system then makes it possible to determine the color in the palette which is closest to the color of the tooth by successively comparing, in order, the quantities s, then J and P, and then B as measured on the tooth with the same quantities as measured on the colors in the palette.

The invention is applicable to determining the colors of translucent objects other than teeth, either without any modification, or else possibly by modifying: the value of one or two of the wavelengths at which reflectance is measured; the standard illuminant for which the saturation percentage and the pigmentations of the color are determined relative to white; and the wavelength ranges over which the pigmentations are determined. Such modifications come within the competence of the person skilled in the art as a function of the kinds of translucent object, and as a function of their colors.

I claim:

1. Apparatus for determining the color of a translucent object, the apparatus comprising a source of polychromatic light associated with an optical system for illuminating the object, an optical system for picking up light diffused by the object, a spectrometer receiving said light, photodetectors disposed at the output from the spectrometer, and an analog-to-digital converter connecting the photodetectors to a data processor system, wherein the spectrometer and the photodetectors are designed to obtain reflectance measurements of the object at wavelengths corresponding essentially to the maxima in the sensitivity of the human eye to hue and to saturation, and wherein the data processor system is programmed to determine, on the basis of said reflectance measurements, a transparency restitution indicator for the object together with a saturation percentage of its color as seen by the human eye and the pigmentations of said color relative to white over predetermined wavelength ranges.

2. Apparatus according to claim 1, wherein the spectrometer and the photodetectors are designed to detect the reflectance of the object at wavelengths substantially equal to 440 nm, 495 nm, 520 nm, 577 nm, and 600 nm.

3. Apparatus according to claim 1, wherein the data processor system is programmed to determine the saturation percentage of the color of the object and the pigmentations of said color relative to white for a determined standard illuminant.

4. Apparatus according to claim 1, wherein the values of saturation percentage, of pigmentation, and of white luminance for colors in a palette as measured under the same conditions as the color of the object are recorded in a memory of the data processor system, which system is programmed to compare sequentially and in order: the saturation percentage of the color of the object with the saturation percentages of the colors of the palette as recorded in the memory, then the pigmentations, and finally the white luminances, thereby determining the color in the palette which is closest to the color of the object, or the pigments to be added to a determined color to obtain the color of the object.

* * * * *